UNITED STATES PATENT OFFICE.

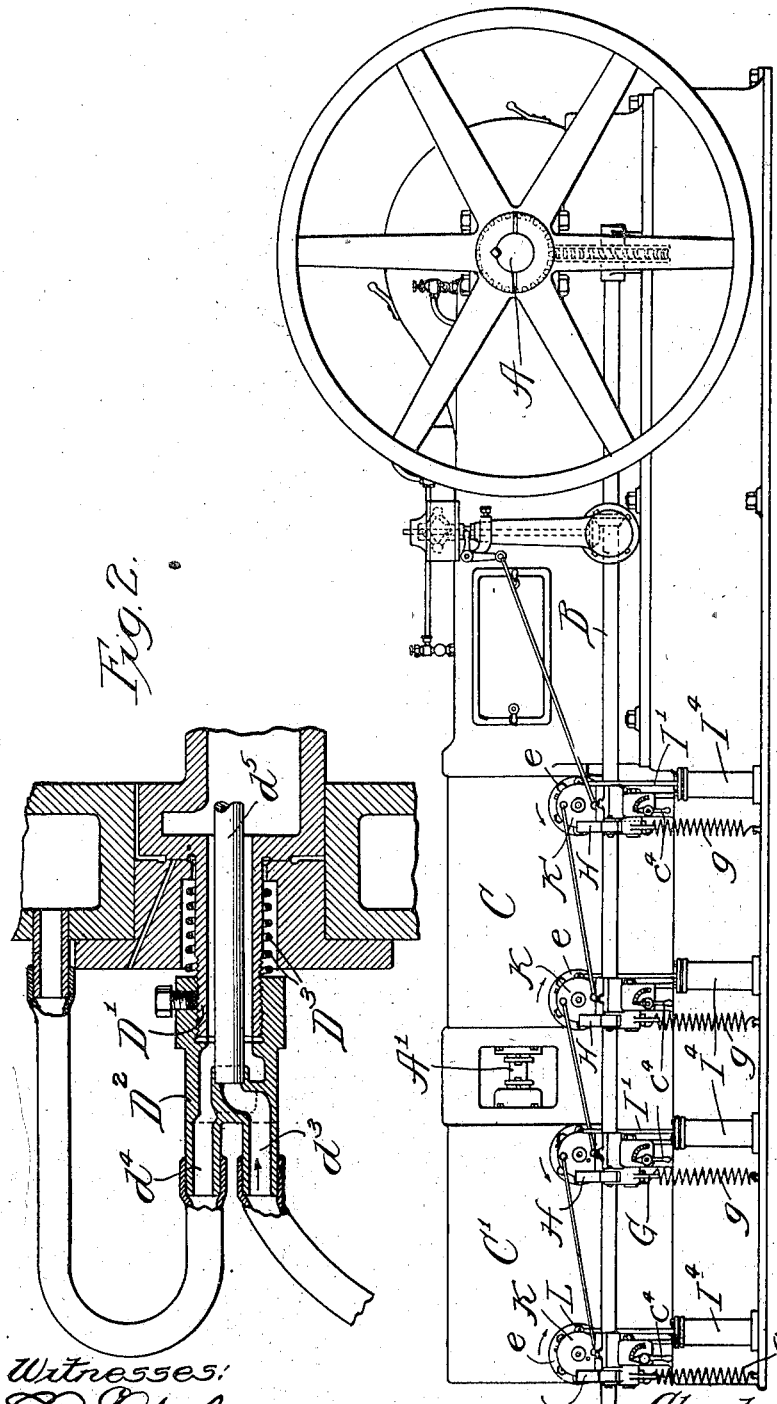

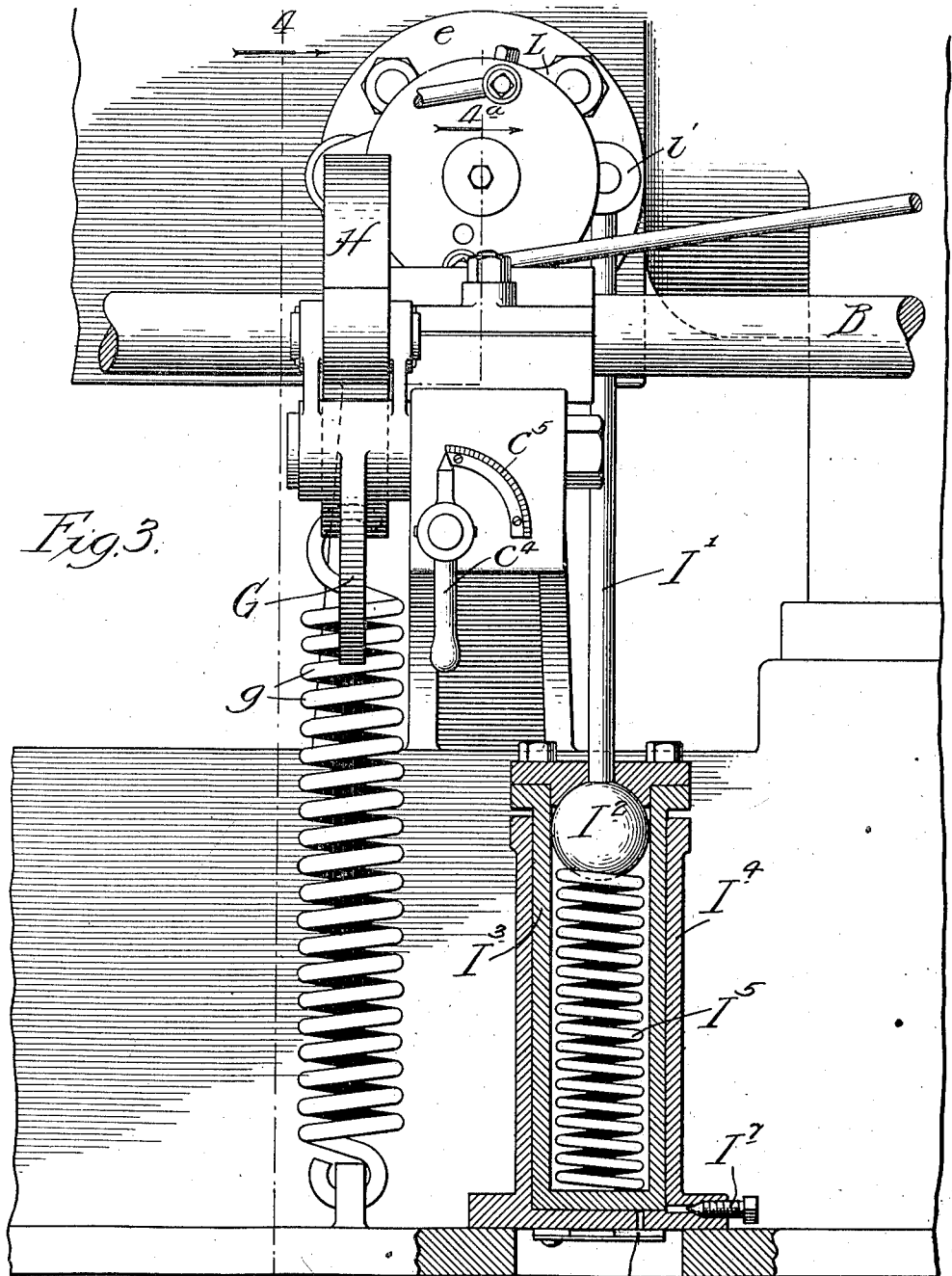

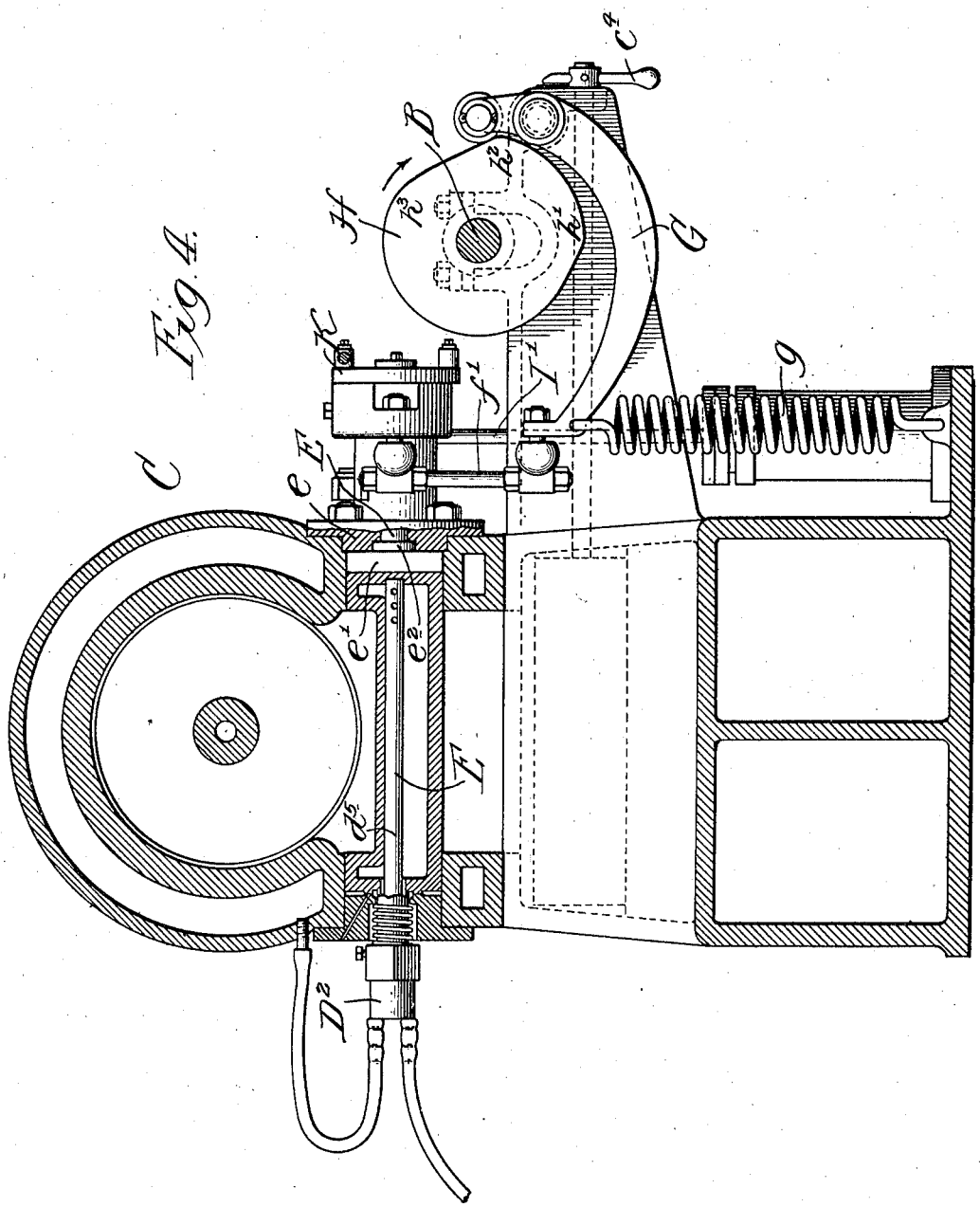

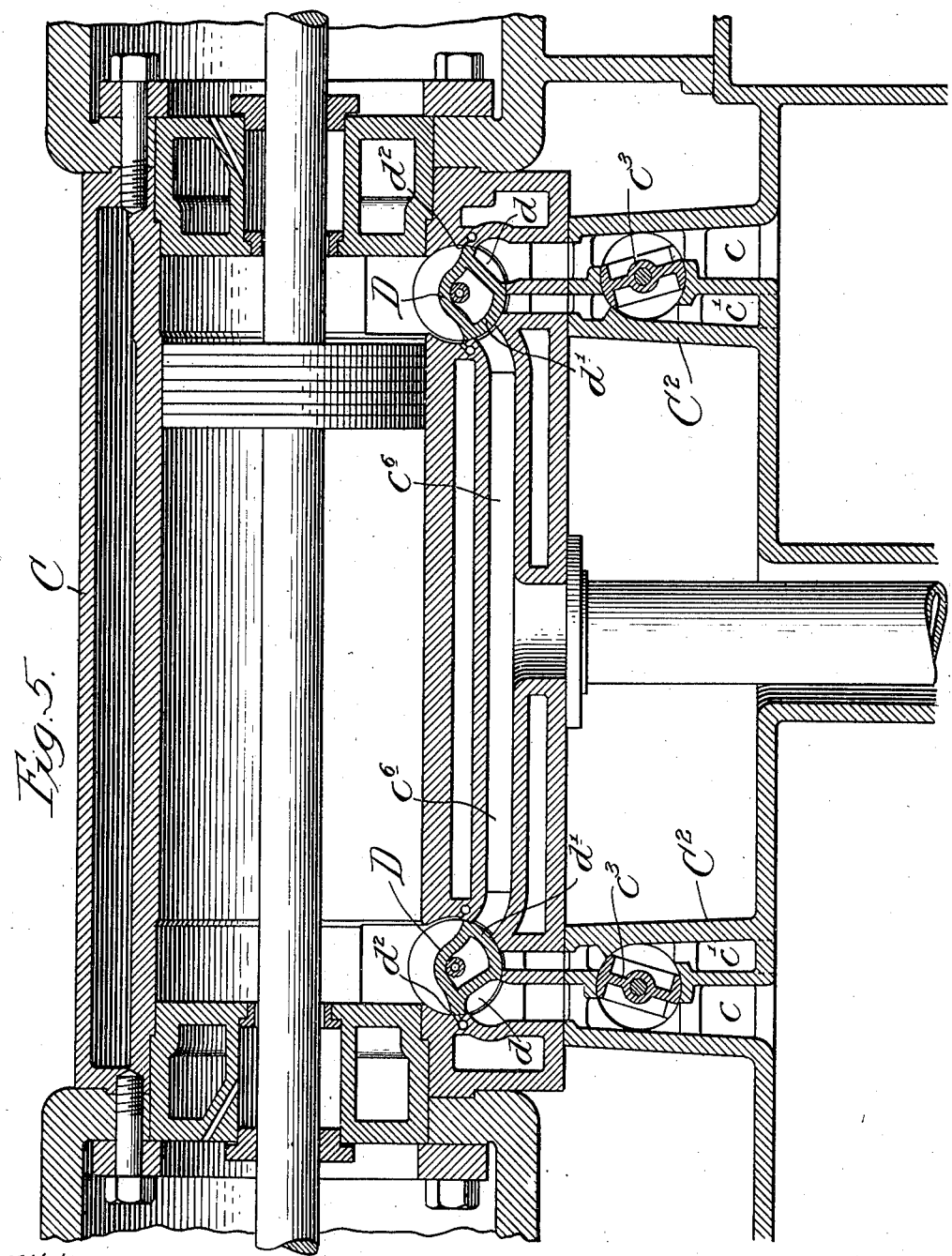

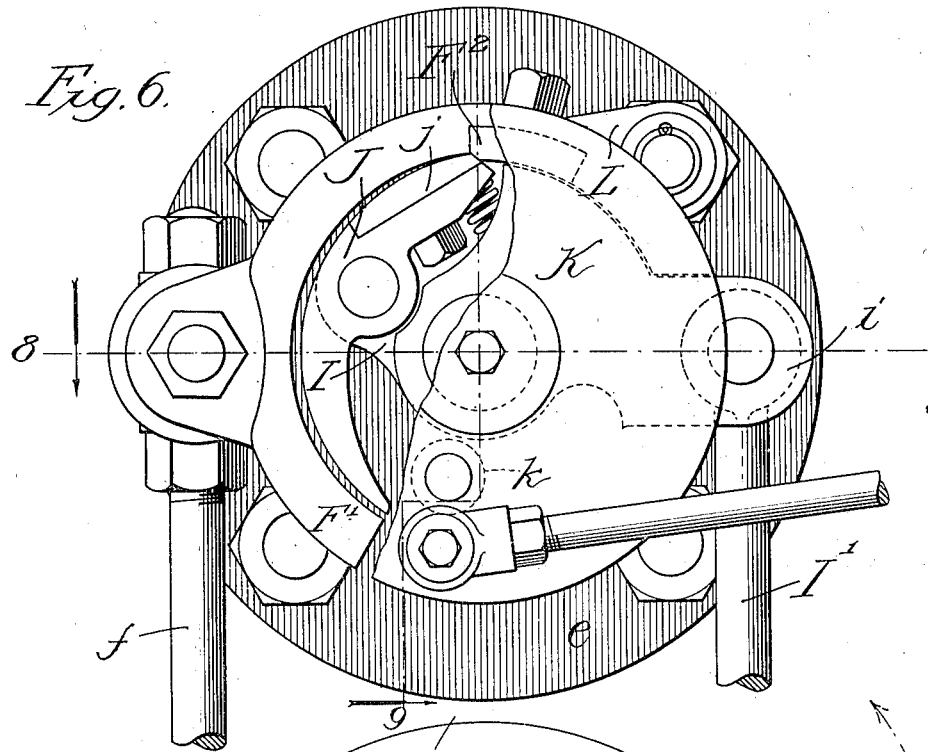
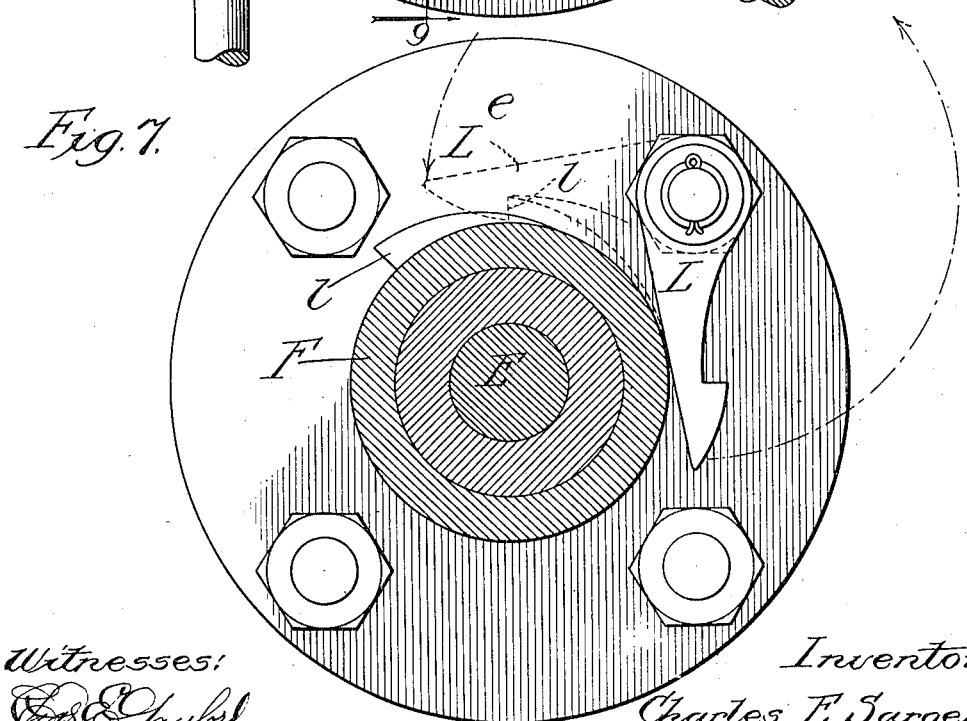

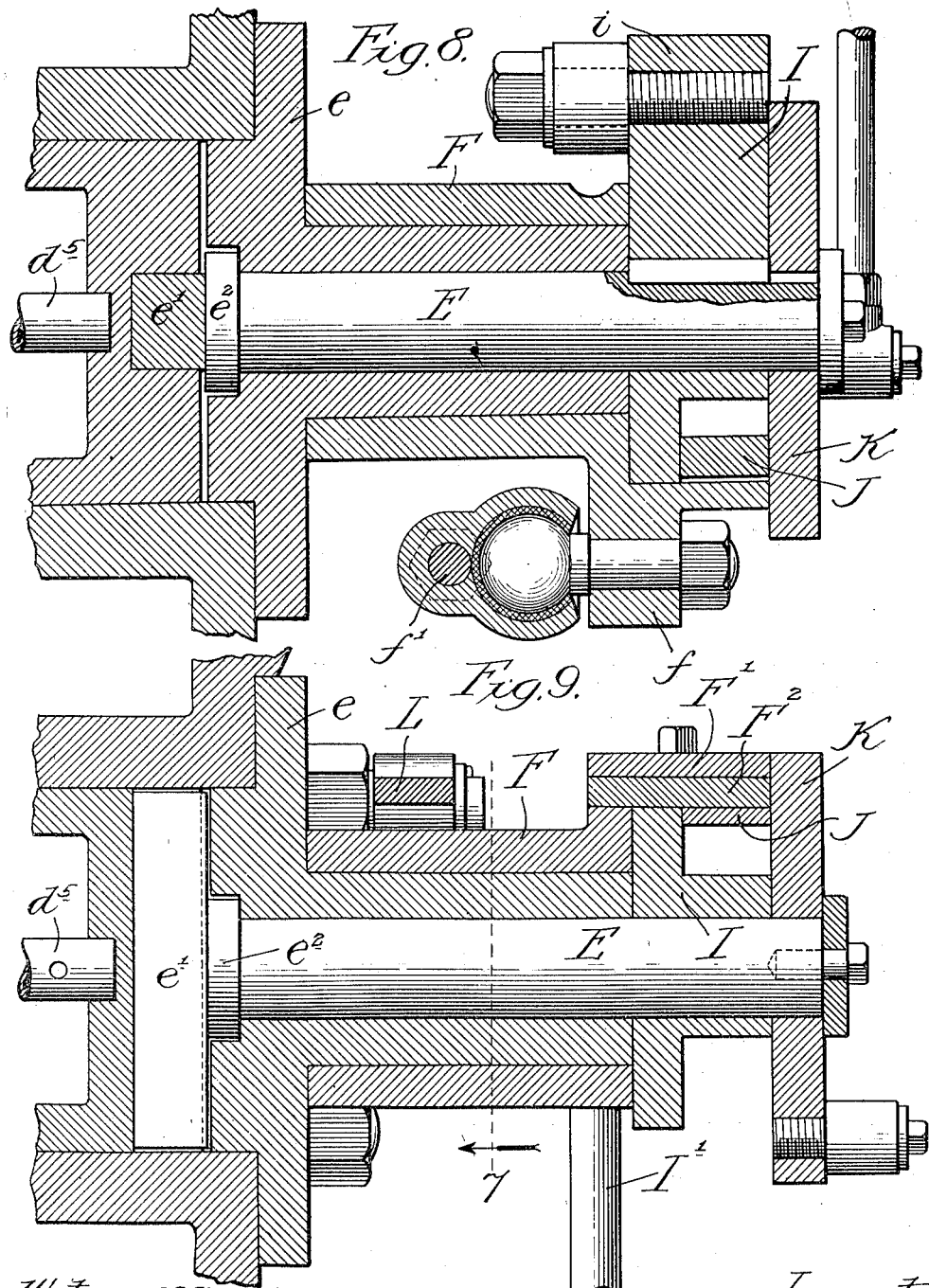

CHARLES E. SARGENT, OF RACINE, WISCONSIN.

INTERNAL-COMBUSTION ENGINE.

1,112,842.     Specification of Letters Patent.     Patented Oct. 6, 1914.

Application filed April 21, 1910. Serial No. 556,897.

*To all whom it may concern:*

Be it known that I, CHARLES E. SARGENT, a citizen of the United States, residing at 843 College avenue, Racine, in the county of Racine and State of Wisconsin, have invented a new and useful Internal-Combustion Engine, of which the following is a specification.

My invention relates to certain new and useful improvements in internal combustion engines and is fully described and explained in the specification and shown in the accompanying drawing, in which:

Figure 1 is a side elevation of an engine embodying my improvement; Fig. 2 is a transverse section of the rear-end of the valve; Fig. 3 is a detailed elevation of one of the valves, the dash-pot being shown in vertical-longitudinal section; Fig. 4 is a transverse section on the line 4, of Fig. 3, the valve however being shown in a transverse plane taken through its center, that is to say on the plane indicated by the line $4^a$ in Fig. 3; Fig. 5 is a central-longitudinal section through one of the cylinders of my improved engine; Fig. 6 is an elevation of the part shown at the upper portion of Fig. 3 behind the cam-shaft, the front plate being broken away to show the parts behind the same; Fig. 7 is a section on the line 7 of Fig. 9; Fig. 8 is a horizontal section on the line 8 of Fig. 6 and Fig. 9 is a vertical section on the line 9 of Fig. 6.

Referring to the drawings, more particularly to Fig. 1, it will be seen that the engine illustrated, which is the one selected for the purpose of illustrating the use of my invention, is of the tandem-type, that is with two cylinders arranged in line, and by reference to Fig. 5 it will be seen that it is of the double-acting type.

A is the crank shaft of the engine, and $A^1$ the piston-rod, which carries two pistons in the ordinary way.

B is the cam-shaft which is connected by gears to the crank-shaft so as to run at half the speed thereof according to usual practice. The cam-shaft runs longitudinally of the cylinders, which are designated in the drawings by C and $C^1$ respectively. The two cylinders are practically the same in construction and arrangement, and one only thereof will require detailed illustration and description, the construction being best shown in Figs. 4 and 5. The cylinders rest upon a hollow base, which is divided longitudinally into two separate parts, one of which contains air and the other gas. The cylinders are supported upon the hollow base by supporting legs $C^2$ which are cored out to provide ports $c$ and $c^1$ for air and gas respectively, the said ports communicating with the corresponding parts of the base for the purpose of receiving their supply therefrom. A valve $c^3$ is provided whereby the proportions of the gas and air can be varied in an obvious manner, an external hand-lever $c^4$ being provided for adjusting said valve, said lever having adjacent to its tip a dial or scale $c^5$ from which the setting of the valve can readily be seen. The ports in question extend transversely of the engine in the form of long slots, so that they have a very large area, and immediately above them the cylinders are provided with transversely-extending cylindrical valve-chambers opening at their upper end into the explosion spaces within the cylinders (Fig. 5). The air and gas ports $c$ and $c^1$ intersect these cylindrical valve-chambers and exhaust ports $c^6$ running horizontally in the lower part of each cylinder also intersect said cylindrical valve-chambers in the manner illustrated, the exhaust ports from the two ends of each cylinder uniting at the center of the cylinder in an exhaust pipe of enlarged size. In the cylindrical valve-chambers are journaled valves D, each of which has cylindrical-heads at its ends for bearing purposes (Fig. 4), is cut away on its upper surface and is provided with a notch $d$ upon one-quarter of its lower surface, which construction is fully illustrated in Fig. 5. The central-portion of the valve thus has two points of contact with the walls of the valve-chambers, a quadrant shaped portion $d^1$ of sufficient size to extend over the gas-port and exhaust-port when the valve is in the position shown in Fig. 5 and a smaller portion $d^2$, about 90° removed from the adjacent corner of said portion $d^1$, said portion $d^2$ contacting with the wall of the valve-chamber above the intersection of the air-port therewith. The valves at the two ends of the cylinder it will be seen are symmetrical with respect to each other, the difference in their construction being caused by the fact that it is desirable to have both exhaust-ports open into a single exhaust-pipe. Owing to the fact that the valves are symmetrical rather than similar their movements will obviously have to be in opposite directions to accomplish the same purposes.

The valves are made hollow in the manner illustrated and are water-cooled by the means shown in Fig. 2, that is to say, each valve is provided with a hollow stem $D^1$ which extends through the rear of the engine wall and carries upon its rear-end a collar $D^2$ having two hose connections $d^3$ and $d^4$. The water flows in through the hose connection $d^3$ then through a central pipe $d^5$ which extends through the hollow of the stem $D^1$ and is of less size than the interior of said stem and is discharged from said pipe at the opposite end of the valve through holes clearly shown in Fig. 4, from whence it flows backward through the valve, thoroughly cooling the same, and out through the collar $D^1$ to the hose connection $d^4$ from whence it is conducted through a hose to the water-jacket of the cylinder. The joint between the valve and rear-end of the cylinder wall is ground and inasmuch as the valve is unbalanced to the extent of the area of the hollow stem $D^1$ the valve will always be held in close contact with this ground-joint, so that leakage will not take place. A spring $D^3$ is provided which holds the valve backward upon this ground-joint, with only sufficient force however to prevent its leaving its seat and slamming when pressure is applied. It is to be noted also that the hollow-stem $D^1$ is made smaller than the opening through which it passes to the end that any wear which may occur between the valve and the lower surface of the valve chamber can be taken up.

The front end of the valve-chamber is closed by a plate or cover $e$ provided with a forwardly extending boss which forms a bearing for a valve-shaft E upon the inner end of which is mounted a T-head $e^1$ which normally extends in a vertical direction and engages a corresponding slot milled in the forward end of the valve. Immediately in front of this T-head the shaft E is provided with a cylindrical collar $e^2$ which closely fits the cover $e$, making a ground-joint therewith, which joint will at all times be held tight because the pressure in the cylinder tends to separate the valve from its shaft. The provision of the T-head and slot in the valve of course will accommodate any slight wear which may take place on the bottom surfaces of the valve.

It will be seen from the foregoing description that the valve-shaft and valve necessarily rotate together as one piece, and before proceeding to the description of the mechanism whereby they are moved, it is deemed proper to set forth the operation which the valves necessarily make to perform their desired functions. Referring to Fig. 5 it will be seen that if the crank-end valve is rotated in a counter clock-wise direction it will open the exhaust port and if rotated in a clock-wise direction it will open the air and gas ports and communication therefrom to the cylinder, the gas flowing out through the notch $d$ and mixing with the air as the same enters. Rotation in the opposite direction will produce corresponding results in the head-end valve at the opposite end of the cylinder. In the drawings, the parts are so shown that the crank-end of cylinder C has just finished its exhaust stroke while the head-end of said cylinder has just finished its working stroke, the engine being so designed that the explosion chambers operate in successive order beginning at the chamber nearest the crank. Therefore in Fig. 5 the crank-end valve is about to open its intake and the head-end valve is about to open the exhaust.

Journaled upon the boss projecting from the cover $e$ of the valve-chamber is a rock-sleeve F which serves as the immediate means for transmitting motion to the valve-shaft and the valve through connections which will presently be described. The rock-sleeve F is provided with a radially projecting arm $f$ which is connected by a link $f^1$ with the end of a cam-engaging lever G pivoted between its ends upon a suitable bracket and provided at its opposite end with a roller engaging a cam H upon the cam-shaft. The cam H is provided with a long dwell which runs from the point $h^1$ to the point $h^3$ indicated thereon, a high portion from the point $h^1$ to the point $h^2$ and a low portion from the point $h^2$ to the point $h^3$. The cam rotates in the direction indicated by the arrow in Fig. 4, so that the lever G remains in its normal position for a considerable period, then has its rear-end raised above the normal position, then has it swung down considerably below the normal position and then returns to the normal position. It will be evident to those skilled in gas-engine practice that the first of these movements, that is the one above the normal position must correspond to the exhaust stroke, and a movement below the normal position must correspond to the intake stroke, while the long dwell, when the parts occupy their normal position, correspond to the compression and working strokes. A spring $g$ holds the lever G in its normal position. It will be evident that these connections are such that the rock-sleeve F will first be turned (in the head-end valve, one of which is illustrated in detail in all the drawings), in a clock-wise direction, will then be turned back through its normal position and therefrom in a counter clock-wise direction and will then return to a normal position. These movements of the rock-sleeve correspond in direction to those which the valve must make to open the exhaust and the intake respectively and it will therefore be evident that if the rock-sleeve can be suitably connected with the valve the necessary movements can be simply accomplished. It is perhaps desirable to add in this connection that the cams are so arranged that the various rock-sleeves are moved in the proper direction to form the exhaust and held there during one entire stroke, and that they are moved in the direction to perform the intake and held there during three-fourths of a stroke, so that the intake will be cut off at three-fourths, to the end that the products of combustion can be completely expanded or practically completely expanded within the cylinders, although it will be evident that this construction could be modified to almost any extent desired.

The valve-shaft E has keyed to it a plate I having a radially projecting arm $i$ to which is connected a rod $I^1$ terminating at its lower end in a ball or other suitable head $I^2$ within a hollow plunger $I^3$ of a dash-pot $I^4$. The head or ball $I^2$ is pressed upward by a spring $I^5$ and the dash-pot is provided at its lower end with a valve $I^6$ and a needle-valve $I^7$, the latter operating to vary the amount of cushioning of the dash-pot. From this construction it will be seen that when the valve is rotated in a direction to open the exhaust, that is in a clock-wise direction, in the valve shown in detail in the drawings, the rod $I^1$ will be depressed compressing the spring $I^5$ and that when the valve is rotated in the opposite direction, that is the direction to open the intake, the hollow-piston $I^3$ of the dash-pot will be bodily raised creating suction below it in the dash-pot, which will tend to return the valve to its original position.

The plate I is cut away on the opposite side from the radial arm $i$ and in the recess formed by such cutting away is pivotally supported a pawl J having a hardened point $j$. The rock-sleeve F is provided with a flange $F^1$ of quadrant or partially annular form (Figs. 6, 8 and 9) which said flange has a shoulder $F^2$ with a hardened insert in position to engage the tip of the pawl J and the opposite end of said flange is in position to engage and bear upon the radial arm $i$ of the plate I. The pawl J is held in a position to engage, with its point or tip, the shoulder on the flange $F^1$ by means of a spring inserted in an obvious manner. The result of this part of the construction is, that the rock-sleeve with its flange and the plate rigid on the valve-shaft E necessarily oscillate together under normal conditions, the end of the flange engaging the radial arm of the plate when the rock-sleeve is turned in a clock-wise direction and the shoulder upon the flange engaging the tip of the pawl or dog when the rock-sleeve is turned in a counter clock-wise direction. These parts are normally held in this fixed engaging relation and moved together at all times in just this way, excepting when the governing-mechanism, presently to be described, comes into action. Therefore in the absence of activity in the governing-means, the parts will remain stationary or normal during the compression and working strokes, they will then rock in a clock-wise direction in the valves illustrated in detail, during the exhaust stroke, the valve being driven through engagement between the end of the flange and the arm on the plate I and they will then move in a counter clock-wise direction from their normal position for three-fourths of the stroke, the plate on the valve-stem being driven through the shoulder on the flange of the rock-sleeve and the dog on the plate.

Each of the valve-shafts carries upon its forward-end, a rotatable cut-off disk K, each of which has upon its rear a roller $k$ in position, when properly moved, to engage the tip of the pawl upon the corresponding plate I when the same is moved in the proper direction to open the intake port. The cut-off disks for the four cylinder ends are coupled up in the manner illustrated so that the two crank end disks rotate in counter clock-wise directions and the two head-end cut-off disks rotate in clock-wise direction at the same time, the head-end cut-off disk of the cylinder C being connected by obvious mechanism with a governor so as to be rotated in the direction mentioned when the governor is affected by an increased speed on the part of the engine. Thus in the valve illustrated in detail in the drawing (which as has been set forth is a head-end valve) the disk K will be rotated in clock-wise direction, as the engine speeds up, and the roller $k$ will move to the left as shown in Fig. 6. The rolller as it moves to the left will contact with the tip of the pawl J at increasingly earlier points in the intake stroke, and, as such contact takes place, it will disengage the tip of the pawl, in an obvious manner, from the shoulder upon the flange of the rock-sleeve, thus releasing the valve-shaft from the cam-operated rock-sleeve. As soon as the valve-stem is released the piston in the dash-pot will instantly close the valve, so that the engine will be governed by varying the amount of combustible mixture drawn in, the most efficient form of governing possible.

This concludes the description of the construction and operation of the valve-mechanism proper and its advantages will doubtless be apparent. It is to be noted that the valve moves only at the times when the exhaust is to be opened and the intake is to be opened and cut-off and consequently at times when the pressure is comparatively low, the bulk of the movement being done under no pressure at all. The valve can be and is in fact thoroughly cooled and there is no opportunity for it to wear unduly. It is so constructed that it can readily be lubricated. Furthermore the construction is simple, the number of parts being reduced to a minimum and there is no reason why the construction should not give thoroughly satisfactory operation.

In addition to the mechanism already described, which may be termed that essential to the valve-mechanism proper, devices are provided for holding the exhaust open so that igniters may be changed while the engine is in operation upon the other cylinders or parts of cylinders. This mechanism consists of a hook L pivotally mounted on the front plate or cover e of the valve-chamber and the shoulder l adapted to be engaged therewith upon the rock-sleeve F. When the parts are in the position shown in solid lines in Fig. 7, that is their normal position the engine operates in the usual manner, as already described. When, however, the hook is thrown to the position shown in dotted lines the next succeeding movement of the rock-sleeve in the direction to open the exhaust port will engage the hook with the shoulder thereon, holding the same in position against the pull of the spring, which is the only power tending to return the same. The exhaust-valve will thus be held open and the pressure in the corresponding cylinder-end will be reduced practically to atmospheric pressure. The hook can readily be disengaged at any time because the tension of the shoulder against it will be released on each revolution of the cam.

I realize that considerable variation is possible in the details of construction of my improved device, without departing from the spirit of my invention, and I do not intend, therefore, to limit myself to the specific form herein shown and described.

What I claim as new and desire to secure by Letters Patent is:—

1. The combination with a cylinder and piston therein, of a cylindrical valve-chamber connected to the cylinder by an opening radial with respect to the valve-chamber, air, gas and exhaust ports entering said chamber in the form of radial slots, a cylindrical oscillating valve adapted in a normal position to close said ports and provided with a space adapted to register with the ports alternately as the valve is oppositely rocked and means for rocking the valve.

2. The combination with a cylinder and piston therein, of a cylindrical valve-chamber connected to the cylinder by an opening radial with respect to the valve-chamber, air, gas and exhaust ports entering said chamber in the form of radial slots, a cylindrical oscillating valve adapted in a normal position to close said ports, and having a peripheral depression adapted to register with the ports alternately as the valve is oppositely rocked, and means for rocking the valve.

3. The combination with a cylinder and piston therein, of a cylindrical valve-chamber connected to the cylinder by an opening radial with respect to the valve-chamber, air, gas and exhaust ports entering said chamber in the form of radial slots, a cylindrical oscillating valve adapted to close said ports, and having a space adapted as the valve is rocked in one direction to open communication between the air and gas ports and the cylinder and as it is rocked in the opposite direction to open communication between the exhaust port and cylinder, and means for rocking the valve.

4. The combination with a cylinder and piston therein, of a cylindrical valve-chamber connected to the cylinder by an opening radial with respect to the valve-chamber, air, gas and exhaust ports entering said chamber in the form of radial slots, a cylindrical oscillating valve adapted in a normal position to close said ports and having a peripheral depression adapted as the valve is rocked in one direction to open communication between the air and gas ports and the cylinder and as the valve is rocked in the opposite direction to open communication between the exhaust port and cylinder, and means for rocking the valve.

5. The combination with a cylinder and piston therein, of a cylindrical valve-chamber connected to the cylinder by an opening radial with respect to the valve-chamber, air, gas and exhaust ports entering said chamber in the form of radial slots, a cylindrical valve within the chamber, adapted in its normal position to close the ports, and having two peripheral depressions, one of said depressions being arranged to open communication between the exhaust port and cylinder and between the air port and cylinder as the valve is rocked in opposite directions, the other of which is adapted to open communication between the gas and air ports, when said first depression opens the air port to the cylinder, whereby the gas and air are mixed as they enter, and means for rocking the valve.

6. The combination with a cylinder and piston therein, of a cylindrical valve-chamber at right angles to the cylinder and connected thereto by an opening radial with respect to the valve-chamber, air, gas and exhaust ports entering said chamber in the form of radial slots, a cylindrical oscillating valve adapted in a normal position to close said ports and provided with a space adapted to register with the ports alternately as the valve is oppositely rocked and means for rocking the valve.

7. The combination with a cylinder and piston therein, of a cylindrical valve-chamber at right angles to the cylinder and connected thereto by an opening radial with respect to the valve-chamber, air, gas and exhaust ports entering said chamber in the form of radial slots, a cylindrical oscillating valve adapted in a normal position to close said ports, and having a peripheral depression adapted to register with the ports alternately as the valve is oppositely rocked, and means for rocking the valve.

8. The combination with a cylinder and piston therein, of a cylindrical valve-chamber at right angles to the cylinder and connected thereto by an opening radial with respect to the valve-chamber, air, gas and exhaust ports entering said chamber in the form of radial slots, a cylindrical oscillating valve adapted to close said ports, and having a space adapted as the valve is rocked in one direction to open communication between the air and gas ports and the cylinder and as it is rocked in the opposite direction to open communication between the exhaust port and cylinder, and means for rocking the valve.

9. The combination with a cylinder and piston therein, of a cylindrical valve-chamber at right angles to the cylinder and connected thereto by an opening radial with respect to the valve-chamber, air, gas and exhaust ports entering said chamber in the form of radial slots, a cylindrical oscillating valve adapted in a normal position to close said ports and having a peripheral depression adapted as the valve is rocked in one direction to open communication between the air and gas ports in the cylinder and as the valve is rocked in the opposite direction to open communication between the exhaust port and cylinder, and means for rocking the valve.

10. The combination with a cylinder and piston therein, of a cylindrical valve-chamber at right angles to the cylinder and connected thereto by an opening radial with respect to the valve-chamber, air, gas and exhaust ports entering said chamber in the form of radial slots, a cylindrical valve within the chamber, adapted in its normal position to close the ports, and having two peripheral depressions, one of said depressions being arranged to open communication between the exhaust port and cylinder and between the air port and cylinder as the valve is rocked in opposite direction, the other of which is adapted to open communication between the gas and air ports, when said first depression opens the air port to the cylinder, whereby the gas and air are mixed as they enter, and means for rocking the valve.

11. The combination with a cylinder and piston therein, of a cylindrical valve-chamber at right angles to the cylinder and at one side thereof and connected therewith by a slot-like opening radial to the valve-chamber and entering the cylinder transversely from the side, air, gas and exhaust ports entering said chamber in the form of radial slots, a cylindrical oscillating valve adapted in a normal position to close said ports and provided with a space adapted to register with the ports alternately as the valve is oppositely rocked and means for rocking the valve.

12. The combination with a cylinder and piston therein, of a cylindrical valve-chamber at right angles to the cylinder and at one side thereof and connected therewith by a slot-like opening radial to the valve-chamber and entering the cylinder transversely from the side, air, gas and exhaust ports entering said chamber in the form of radial slots, a cylindrical oscillating valve adapted in a normal position to close said ports, and having a peripheral depression adapted to register with the ports alternately as the valve is oppositely rocked, and means for rocking the valve.

13. The combination with a cylinder and piston therein, of a cylindrical valve-chamber at right angles to the cylinder and at one side thereof, and connected therewith by a slot-like opening radial to the valve-chamber and entering the cylinder transversely from the side, air, gas and exhaust ports entering said chamber in the form of radial slots, a cylindrical oscillating valve adapted to close said ports, and having a space adapted as the valve is rocked in one direction to open communication between the air and gas ports and the cylinder and as it is rocked in the opposite direction to open communication between the exhaust port and cylinder, and means for rocking the valve.

14. The combination with a cylinder and piston therein, of a cylindrical valve-chamber at right angles to the cylinder and at one side thereof and connected therewith by a slot-like opening radial to the valve-chamber and entering the cylinder transversely from the side, air, gas and exhaust ports entering said chamber in the form of radial slots, a cylindrical oscillating valve adapted in a normal position to close said ports and having a peripheral depression adapted as the valve is rocked in one direction to open communication between the air and gas ports in the cylinder and as the valve is rocked in the opposite direction to open communication between the exhaust port and cylinder, and means for rocking the valve.

15. The combination with a cylinder and piston therein, of a cylindrical valve-chamber at right angles to the cylinder and at one side thereof and connected therewith by a slot-like opening radial to the valve-chamber and entering the cylinder transversely from the side, air, gas and exhaust ports entering said chamber in the form of radial slots, a cylindrical valve within the chamber, adapted in its normal position to close the ports, and having two peripheral depressions, one of said depressions being arranged to open communication between the exhaust port and cylinder and between the air port and cylinder as the valve is rocked in opposite direction, the other of which is adapted to open communication between the gas and air ports, when said first depression opens the air port to the cylinder, whereby the gas and air are mixed as they enter, and means for rocking the valve.

16. The combination with a cylinder and piston therein, of a cylindrical valve-chamber connected to the cylinder by a slot-like opening radial to the valve-chamber and extending across substantially the entire width of the cylinder, air, gas and exhaust ports entering said chamber in the form of radial slots, a cylindrical oscillating valve adapted in a normal position to close said ports and provided with a space adapted to register with the ports alternately as the valve is oppositely rocked and means for rocking the valve.

17. The combination with a cylinder and piston therein, of a cylindrical valve-chamber connected to the cylinder by a slot-like opening radial to the valve-chamber and extending across substantially the entire width of the cylinder, air, gas and exhaust ports entering said chamber in the form of radial slots, a cylindrical oscillating valve adapted in a normal position to close said ports, and having a peripheral depression adapted to register with the ports alternately as the valve is oppositely rocked, and means for rocking the valve.

18. The combination with a cylinder and piston therein, of a cylindrical valve-chamber connected to the cylinder by a slot-like opening radial to the valve-chamber and extending across substantially the entire width of the cylinder, air, gas and exhaust ports entering said chamber in the form of radial slots, a cylindrical oscillating valve adapted to close said ports, and having a space adapted as the valve is rocked in one direction to open communication between the air and gas ports and the cylinder and as it is rocked in the opposite direction to open communication between the exhaust port and cylinder, and means for rocking the valve.

19. The combination with a cylinder and piston therein, of a cylindrical valve-chamber connected to the cylinder by a slot-like opening radial to the valve-chamber and extending across substantially the entire width of the cylinder, air, gas and exhaust ports entering said chamber in the form of radial slots, a cylindrical oscillating valve adapted in a normal position to close said ports and having a peripheral depression adapted as the valve is rocked in one direction to open communication between the air and gas ports in the cylinder and as the valve is rocked in the opposite direction to open communication between the exhaust port and cylinder, and means for rocking the valve.

20. The combination with a cylinder and piston therein, of a cylindrical valve-chamber connected to the cylinder by a slot-like opening radial to the valve-chamber and extending across substantially the entire width of the cylinder, air, gas and exhaust ports entering said chamber in the form of radial slots, a cylindrical valve within the chamber, adapted in its normal position to close the ports, and having two peripheral depressions, one of said depressions being arranged to open communication between the exhaust port and cylinder and between the air port and cylinder as the valve is rocked in opposite direction, the other of which is adapted to open communication between the gas and air ports, when said first depression opens the air port to the cylinder, whereby the gas and air are mixed as they enter, and means for rocking the valve.

21. The combination with a cylinder and piston therein, of a cylindrical valve-chamber below the cylinder in a horizontal transverse position and having connection with the cylinder through a slot-like opening radial to the valve-chamber and intersecting the bottom of the cylinder near its end, air, gas and exhaust ports entering said chamber in the form of radial slots, a cylindrical oscillating valve adapted in a normal position to close said ports and provided with a space adapted to register with the ports alternatively as the valve is oppositely rocked and means for rocking the valve.

22. The combination with a cylinder and piston therein, of a cylindrical valve-chamber below the cylinder in a horizontal transverse position and having connection with the cylinder through a slot-like opening radial to the valve-chamber and intersecting the bottom of the cylinder near its end, air, gas and exhaust ports entering said chamber in the form of radial slots, a cylindrical oscillating valve adapted in a normal position to close said ports, and having a peripheral depression adapted to register with the ports alternatively as the valve is oppositely rocked, and means for rocking the valve.

23. The combination with a cylinder and piston therein, of a cylindrical valve-chamber below the cylinder in a horizontal transverse position and having connection with the cylinder through a slot-like opening radial to the valve-chamber and intersecting the bottom of the cylinder near its end, air, gas and exhaust ports entering said chamber in the form of radial slots, a cylindrical oscillating valve adapted to close said ports, and having a space adapted as the valve is rocked in one direction to open communication between the air and gas ports and the cylinder and as it is rocked in the opposite direction to open communication between the exhaust port and cylinder, and means for rocking the valve.

24. The combination with a cylinder and piston therein, of a cylindrical valve-chamber below the cylinder in a horizontal transverse position and having connection with the cylinder through a slot-like opening radial to the valve-chamber and intersecting the bottom of the cylinder near its end, air and gas exhaust ports entering said chamber in the form of radial slots, a cylindrical oscillating valve adapted in a normal position to close said ports and having a peripheral depression adapted as the valve is rocked in one direction to open communication between the air and gas ports in the cylinder and as the valve is rocked in the opposite direction to open communication between the exhaust port and cylinder, and means for rocking the valve.

25. The combination with a cylinder and piston therein, of a cylindrical valve-chamber below the cylinder in a horizontal transverse position and having connection with the cylinder through a slot-like opening radial to the valve-chamber and intersecting the bottom of the cylinder near its end, air, gas and exhaust ports entering said chamber in the form of radial slots, a cylindrical valve within the chamber, adapted in its normal position to close the ports, and having two peripheral depressions, one of said depressions being arranged to open communication between the exhaust port and cylinder and between the air port and cylinder as the valve is rocked in opposite direction, the other of which is adapted to open communication between the gas and air ports, when said first depression opens the air port to the cylinder, whereby the gas and air are mixed as they enter, and means for rocking the valve.

26. The combination with a cylinder and piston of a cylindrical valve-chamber connected to the cylinder by an opening radial with respect to the valve-chamber, a port entering the valve-chamber in the form of a radial slot, and a cylindrical oscillating-valve adapted in its normal position to close said port and having a space adapted to register therewith as the valve is oscillated to throw the port into communication with the cylinder, said valve having attached to it at one end a longitudinally movable part whereby pressure may hold said valve against one end of the valve chamber and said part against the other end.

27. The combination with a cylinder and piston of a cylindrical valve-chamber connected to the cylinder by an opening radial with respect to the valve-chamber, a port entering the valve-chamber in the form of a radial slot, a cylindrical oscillating-valve adapted in its normal position to close said port and having a space adapted to register therewith as the valve is oscillated to throw the port into communication with the cylinder, a valve stem separably attached to said valve whereby the valve may be held by pressure against one end and the stem against the other end of the valve-chamber.

28. The combination with a cylinder and piston of a cylindrical valve-chamber connected to the cylinder by an opening radial with respect to the valve-chamber, a port entering the valve-chamber in the form of a radial slot, a cylindrical oscillating valve adapted in its normal position to close said port having a space adapted to register therewith as the valve is oscillated to throw the port into communication with the cylinder, a valve-stem having a T-head running in a slot in the valve and separable therefrom, whereby internal pressure will separate the valve-stem and valve holding each against the corresponding end of the valve-chamber.

29. The combination with a cylinder and piston of a cylindrical valve-chamber connected to the cylinder by an opening radial with respect to the valve-chamber, a port entering the valve-chamber in the form of a radial slot, a cylindrical oscillating valve adapted in its normal position to close said port and having a space adapted to register therewith as the valve is oscillated to throw the port into communication with the cylinder, said valve being hollow and means for supplying cooling liquid to the interior of the valve.

30. The combination with a cylinder and piston of a cylindrical valve-chamber connected to the cylinder by an opening radial with respect to the valve-chamber, a port entering the valve-chamber in the form of a radial slot, a cylindrical oscillating valve adapted in its normal position to close said port and having a space adapted to register therewith as the valve is oscillated to throw the port into communication with the cylinder, said valve being hollow and having a hollow sleeve extending from one of its ends through the wall of the valve-chamber, a tube entering the sleeve and liquid-conducting means secured to the tube and sleeve.

31. The combination with a cylinder and piston of a cylindrical valve-chamber connected to the cylinder by an opening radial with respect to the valve-chamber, fuel and exhaust ports entering the valve-chamber in the form of radial slots, a cylindrical oscillatable valve adapted in its normal position to close said ports and having a space to register therewith alternatively as the valve is oppositely rocked to open communication between the same and the cylinder, said valve being hollow and means for supplying cooling liquid to the interior of the valve.

32. The combination with a cylinder and piston therein, of a cylindrical valve-chamber connected to the cylinder by an opening radial with respect to the valve-chamber, air, gas and exhaust ports entering the valve-chamber in the form of radial slots, a cylindrical oscillatable valve adapted in its normal position to close said ports and having a space adapted as the valve is oppositely oscillated to uncover said ports alternately, said valve being hollow and having a hollow sleeve extending from one of its ends through the wall of the valve-chamber, a tube entering the sleeve and liquid-conducting means secured to the tube and sleeve.

33. The combination with a cylinder and piston therein, of a cylindrical valve-chamber connected to the cylinder by an opening radial with respect to the valve-chamber, air, gas and exhaust ports entering said valve-chamber in the form of radial slots, a cylindrical oscillatable valve adapted in its normal position to close said ports and having a space adapted as the valve is rocked in one direction to open communication between the gas and air ports in the cylinder and as it is rocked in the opposite direction to open communication between the exhaust port and the cylinder, said valve being hollow and means for supplying cooling liquid to the interior of the valve.

34. The combination with a cylinder and piston therein, of a cylindrical valve-chamber connected to the cylinder by an opening radial with respect to the valve-chamber, air, gas and exhaust ports entering said valve-chamber in the form of radial slots, a cylindrical oscillatable valve adapted in its normal position to close said ports and having a space adapted as the valve is rocked in one direction to open communication between the gas and air ports in the cylinder and as it is rocked in the opposite direction to open communication between the exhaust port and the cylinder, said valve being hollow and having a hollow sleeve extending from one of its ends through the wall of the valve-chamber, a tube entering the sleeve and liquid-conducting means secured to the tube and sleeve.

In testimony whereof, I have hereunto set my hand at Chicago, Illinois, this 18th day of April, nineteen hundred and ten, in the presence of two subscribing witnesses.

CHARLES E. SARGENT.

In presence of—
  L. HEISLAR,
  R. SCHAEFER.